(12) United States Patent
Martin et al.

(10) Patent No.: US 10,969,753 B2
(45) Date of Patent: Apr. 6, 2021

(54) COMMISSIONING NETWORKED SYSTEMS FOR SMART BUILDING SYSTEM INTEGRATION

(71) Applicant: Greenlight IOT, Inc., Edwardsville, IL (US)

(72) Inventors: Kevin Martin, Ipswich, MA (US); Anthony Garcia, Rocklin, CA (US)

(73) Assignee: Greenlight IOT, Inc., Edwardsville, IL (US)

( * ) Notice: Subject to any disclaimer, the term of this patent is extended or adjusted under 35 U.S.C. 154(b) by 367 days.

(21) Appl. No.: 15/833,509

(22) Filed: Dec. 6, 2017

(65) Prior Publication Data

US 2019/0072918 A1 Mar. 7, 2019

Related U.S. Application Data

(60) Provisional application No. 62/554,389, filed on Sep. 5, 2017.

(51) Int. Cl.
*G06F 17/50* (2006.01)
*G05B 15/02* (2006.01)
*H04L 12/28* (2006.01)

(52) U.S. Cl.
CPC ............ *G05B 15/02* (2013.01); *H04L 12/283* (2013.01); *H04L 12/2809* (2013.01); *H04L 2012/285* (2013.01); *H04L 2012/2841* (2013.01)

(58) Field of Classification Search
CPC ....... H04N 5/2256; H04W 4/70; G05B 15/02; H04L 12/2809; H04L 12/283; H04L 2012/285; H04L 2012/284
See application file for complete search history.

(56) References Cited

U.S. PATENT DOCUMENTS

| 7,953,327 | B2 | 5/2011 | Pereira et al. |
| 7,953,419 | B2 | 5/2011 | Jost et al. |
| 8,049,434 | B2 | 11/2011 | Crouse et al. |
| 8,265,674 | B2 | 9/2012 | Choong et al. |
| 8,422,401 | B1 | 4/2013 | Choong et al. |
| 8,503,330 | B1 * | 8/2013 | Choong ............... H04W 24/02 370/254 |
| 8,660,121 | B2 | 2/2014 | McCormack |
| 9,197,843 | B2 * | 11/2015 | Mast ................... H04L 41/0806 |
| 2013/0141223 | A1 * | 6/2013 | Brandsma ............... G06K 7/01 340/10.51 |

(Continued)

*Primary Examiner* — Jason D Recek
*Assistant Examiner* — Ranjan Pant
(74) *Attorney, Agent, or Firm* — Maxey-Fisher, PLLC; Brittany J. Maxey-Fisher (57) ABSTRACT

According to various aspects, exemplary embodiments are disclosed of building system device node commissioning systems, methods, apparatus, tools, and/or devices. In an exemplary embodiment, at least one commissioning apparatus is configured to analyze networked system design data, generate unique room-zone identifiers for the building system device nodes, generate one or more custom project workbooks for inclusion of the unique room-zone identifiers and individual device addresses for installed building system device nodes, and identify physical locations of the installed building system device nodes using the one or more custom project workbooks including the unique room-zone identifiers and the individual device addresses of the installed building system device nodes.

20 Claims, 5 Drawing Sheets

(56) References Cited

U.S. PATENT DOCUMENTS

| | | | |
|---|---|---|---|
| 2014/0023336 A1* | 1/2014 | Mast | H04N 5/765 386/200 |
| 2015/0331969 A1* | 11/2015 | Dahlen | G06F 17/50 703/1 |
| 2016/0085884 A1* | 3/2016 | Schafer | H05B 37/0272 703/1 |
| 2016/0094994 A1* | 3/2016 | Kirkby | G06K 9/00711 380/270 |
| 2016/0335731 A1* | 11/2016 | Hall | G06Q 50/163 |
| 2017/0241200 A1* | 8/2017 | Feldstein | E06B 9/68 |

* cited by examiner

COMMISSIONING NETWORKED SYSTEMS FOR SMART BUILDING SYSTEM INTEGRATION

CROSS-REFERENCE TO RELATED APPLICATION

This application claims the benefit and priority of U.S. Provisional Patent Application No. 62/554,389 filed Sep. 5, 2017. The entire disclosure of the above application is incorporated herein by reference.

FIELD

The present disclosure generally relates to commissioning networked systems for smart building system integration.

BACKGROUND

This section provides background information related to the present disclosure which is not necessarily prior art.

The commercial lighting and building automation market has experienced a revolution of shorts through new advancements in wireless and wired technologies (e.g., increased computing power of embedded and non-embedded sensors, efficiencies of lighting luminaires, and expanded offerings of building system device nodes, among others).

These advancements in design, functionality, and networking technology now allow for the networkability of single building system device nodes into holistic building system platforms—both wired and wireless. This convergence of historically siloed building systems and building system device nodes (e.g., lighting, heating and ventilation, air-conditioning, motors, drives, valves and other building systems) is bridging the networking gap to create single building system platforms.

These new networked building control and automation platforms additionally allow for the digitization of building system device node functionalities and operability performances, which thereby provide building operators the ability to better control, monitor, and optimize building systems through a single platform.

Some of the many benefits that a single building control and automation platform provide, include, the monitorability of multiple building systems across multiple physical buildings. This drive of innovation demand is pushing the marketplace to shift focus and develop new technologies, products, and services to match end-user expectations.

Moreover, the demand for more advanced networking technologies has led to the creation of new device networking methods (wired and wireless), commissioning approaches, and installation processes. Such advancements in the wireless controls space can be found in U.S. patents, such as U.S. Pat. Nos. 8,660,121, 8,503,330, 8,265,674, 8,049,434, 7,953,419, and 7,953,327.

The abovementioned U.S. Patents describe processes and methods on how to establish connection between individual building system device nodes and commission them onto a single system platform. While each of these methods and processes may differ in relation to one another from a technology standpoint, each share a few similarities.

First and foremost, any networked node in the majority of cases must contain a Media Access Control (MAC) address and/or an individual IEEE address, as required under all current and future versions of the 802.xx.x IEEE standard, to identify the individual node as a single device. These addresses are unique identifying addresses per each individual node connecting to a network.

The second commonality across node networking methods is in their shortcomings in identifying building system device node locations within a building.

Commissioning (as outlined using varying methods in the above-mentioned patents) is generally the process and/or act of setting up a network (either wired or wireless) to configure system nodes to a system, test their operability, verify their correct operation, and finalize their desired configurations. This may include, for example, setting the parameters from which the building system device node will behave/what the building system device node will do.

Though the above mentioned patents describe technologies and methods for commissioning individual building system device nodes to a networked system, the inventors hereof have recognized a need in the art for a sufficient method for identifying the physical location of the building system device node within a building infrastructure (internally and/or externally) in a timely or accurate manner. Moreover, the inventors have also recognized that existing technologies or methods to identify physical locations of building system device nodes are labor intensive, time consuming, and many times do not provide accurate locations of building system device nodes within a networked system.

This shortfall therefore requires additional labor, time, and investment to properly identify the location of building system device nodes and is a significant contributor to the high labor cost of installing these styles of networked systems.

Current art can be categorized into two types of methods for determining building system device node locations. The first type is physical onsite identification by commissioning specialist. This method requires a commissioning specialist to physically visit a building and use the networked system's commissioning platform to instruct each node to identify its physical location via network ping and/or flash sequence in the case of a lighting luminaire. The networked system's commissioning platform could be accessible from a laptop and/or other wireless device that has commissioning capabilities.

The second commonly mentioned and used method is geo-location and triangulation. This method also requires a commissioning specialist to physically visit a building and use the networked system-specific commissioning platform and GPS-enabled unit to determine the specific coordinates of each building system device node position.

As recognized by the inventors hereof, the current art available introduces new methods to connect building system device nodes to a network (wirelessly or wired) but does not provide adequate methods/solutions to identifying building system device node locations in a timely and accurate manner. This industry-wide shortfall results in large investments of time and labor cost to make these systems functional. Not only do these existing methods require time and investment but they can also be incredibly inconsistent especially the first type of method including the physical onsite identification by commissioning specialist. Also, installing contractors vary widely and if left to their own devices the recording of building system device node addresses can and will vary widely. This inconsistency ultimately results in the incorrect recording of building system device node locations and/or incomplete records of building system device node locations, thereby rendering the networked system inoperable as originally designed.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

While exemplary embodiments (e.g., building system device node commissioning systems, methods, apparatus, tools, devices, system S100 (FIGS. 3 and 5), method M100 (FIG. 4), commissioning tool T100 (FIGS. 3 and 4), etc.) are disclosed herein being used with or in connection to lighting fixtures and control devices, exemplary embodiments disclosed herein may also be used with and apply to other controllable devices within a wireless or wired networked system (e.g., ventilation units, air condition units, relay controllers, pumps, motors, valves, etc.). Therefore, the term "building system device node" as used herein is intended to include and encompass all such controllable or monitorable building system device nodes, mechanisms, devices, etc.

The commissioning of building system device nodes into a networked system platform can vary from technology to technology (e.g., wired, wireless, hybrid, etc.). As recognized by the inventors hereof, the common dominator across existing commissioning methods is the lack of capacity to efficiently and accurately record building system device node locations consistently.

Figure 1:
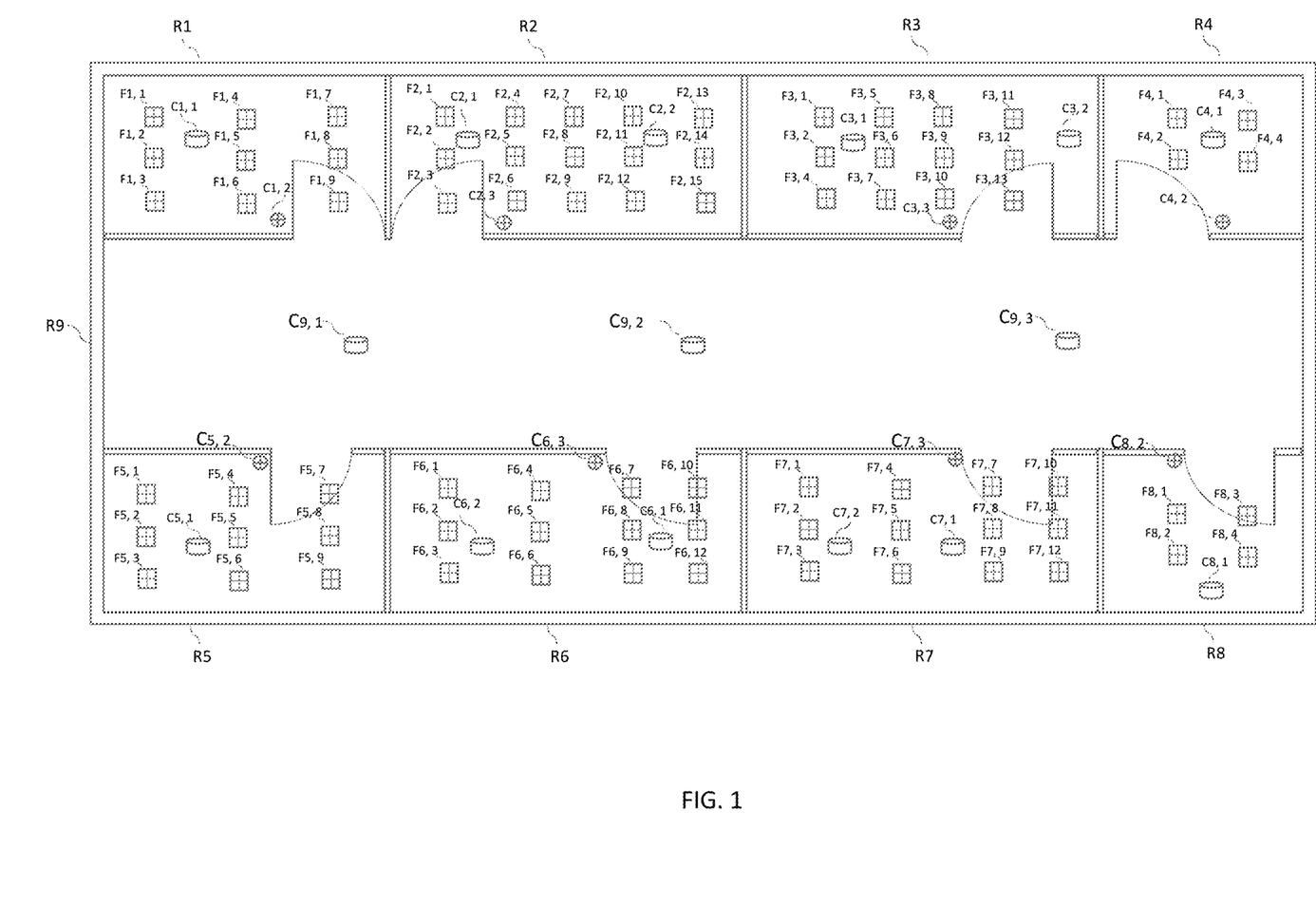
FIG. 1 shows a typical schematic building plan indicating the placement of luminaires, occupancy sensors, and other building system device nodes in a typical networked system.

FIG. 1 shows a typical building schematic for a networked controls system. Groupings of areas are represented by R1, R2, R3, R4, R5, R6, R7, R8, and R9. These area groupings represent rooms and/or zones on a given floor of a building. Within each of these rooms, there are networked building system device nodes. For example, in area R1, luminaire device nodes are represented by F1,1; F1,2; F1,3; F1,4; F1,5; F1,6; F1,7; F1,8; F1,9; F2,1 to F2,15; F3,1 to F2,13; F4,1 to F4,4; F5,1 to F5,9; F6,1 to F6,12; F7,1 to F7,12; F8,1 to F8,4. Occupancy sensor device nodes are represented by C1,1; C2,1; C2,2; C3,1; C3,2; C4,1; C5,1; C6,1; C6,2; C7,1; C7,2; and C8,1. Additional building system device nodes are represented by C1,2; C2,3; C3,3; C4,2; C5,2; C6,3; C7,3; C8,2; C9,1; C9,2; and C9,3.

Each of these building system device nodes are independent of one another. More specifically, each building system device node contains a unique identifier or unique identifying tag, such as a Media Access Control (MAC) address and/or an individual IEEE address, as required under all current and future versions of the 802.xx.x IEEE standard. Each building system device node can communicate with each other building system device node via wireless technology and/or traditional wiring schematics.

The building system device nodes can also communicate to a centralized networked system platform. Commissioning building system device nodes into a centralized networked system platform requires the physical location of each building system device node to be determined or known.

While current building system device node location methods exist, the inventors hereof have recognized that no conventional solution allows for the specific identification of building system device nodes in a timely and efficient manner. Moreover, categorizing and sorting building system device nodes by grouping area such as shown in FIG. 1 (e.g., R1, R2, R3, R4, etc.) is not possible or realized by existing conventional solutions.

Figure 3:
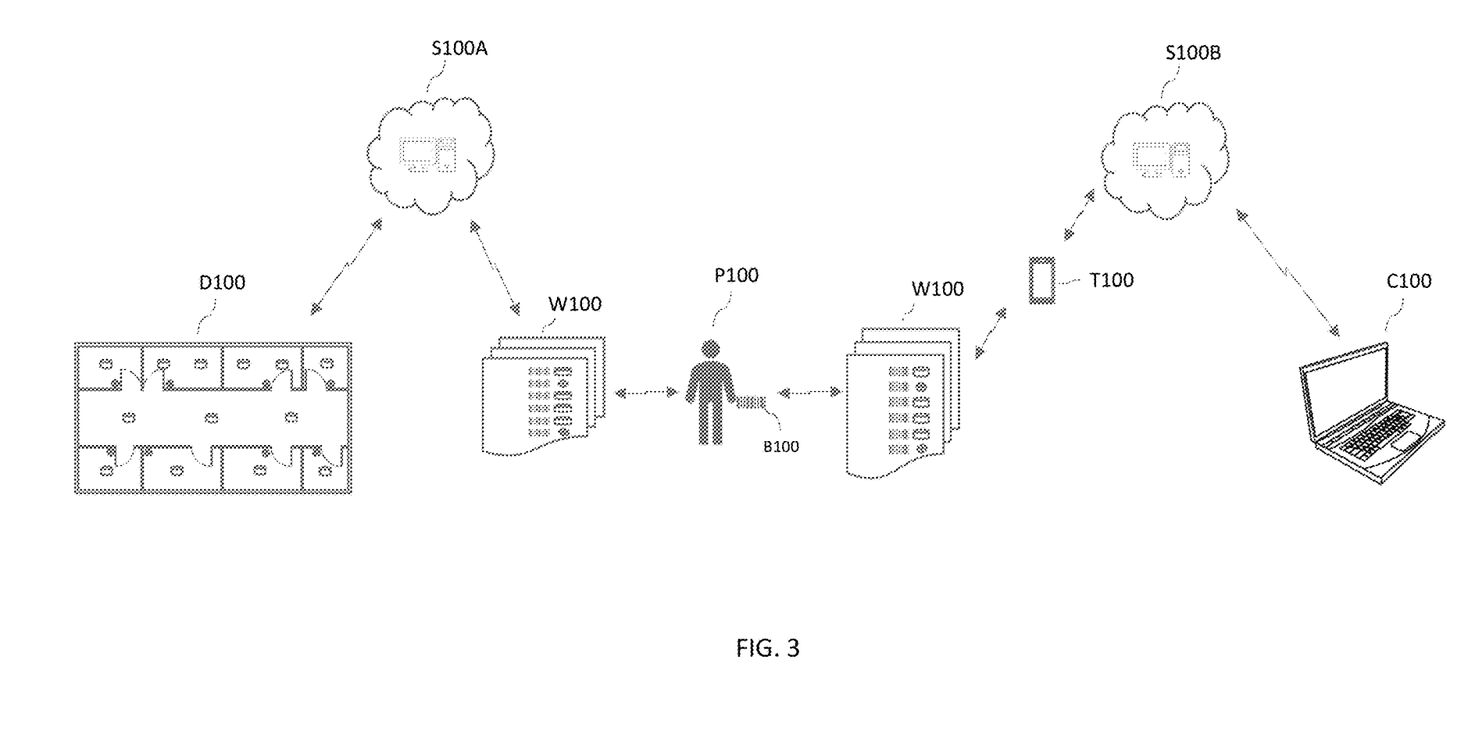
FIG. 3 shows a building system device node commissioning system and method including a commissioning tool in accordance with exemplary embodiments of the invention.
Figure 4:
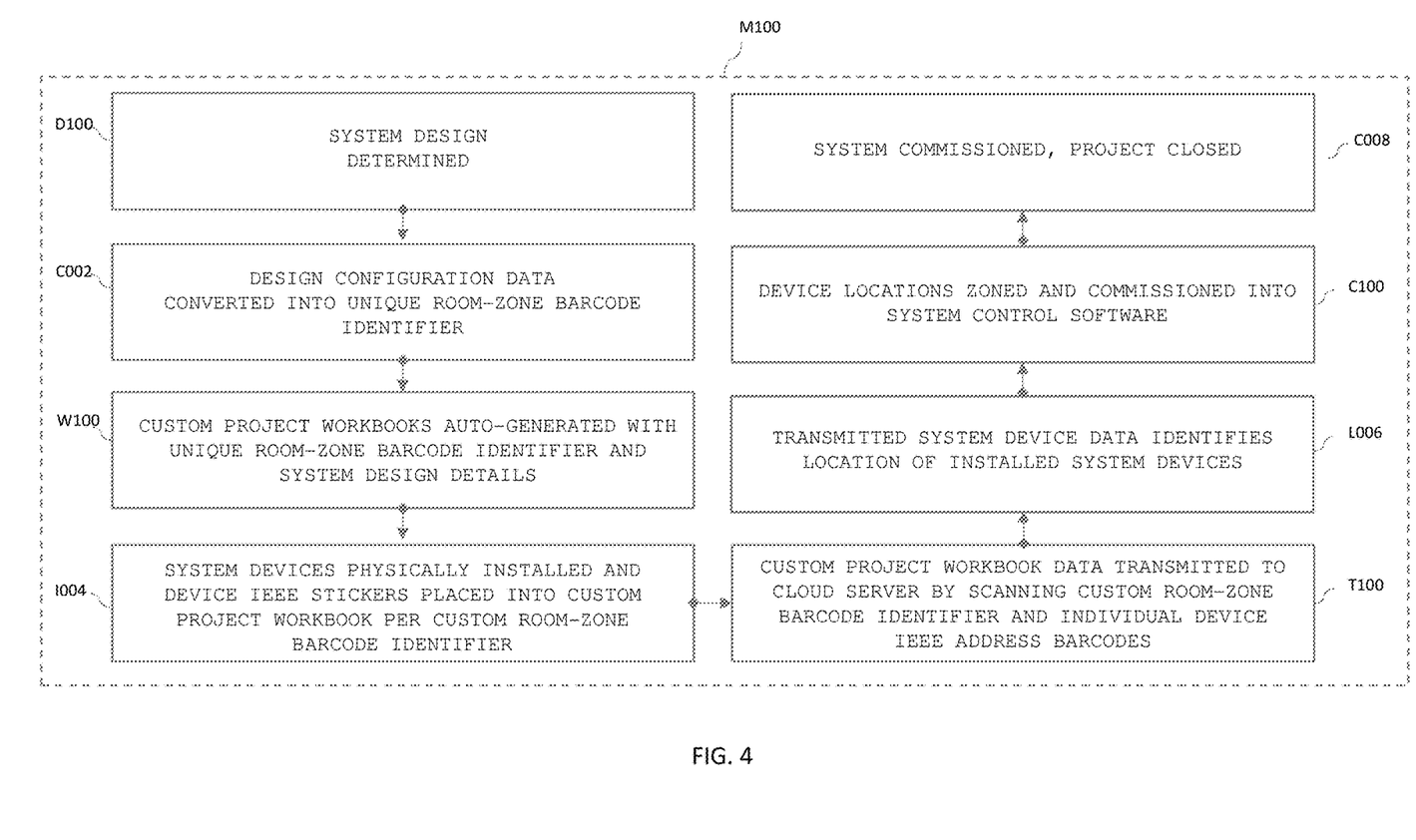
FIG. 4 shows a block diagram depicting a building system device node commissioning method using a commissioning tool in accordance with exemplary embodiments of the invention.
Figure 5:
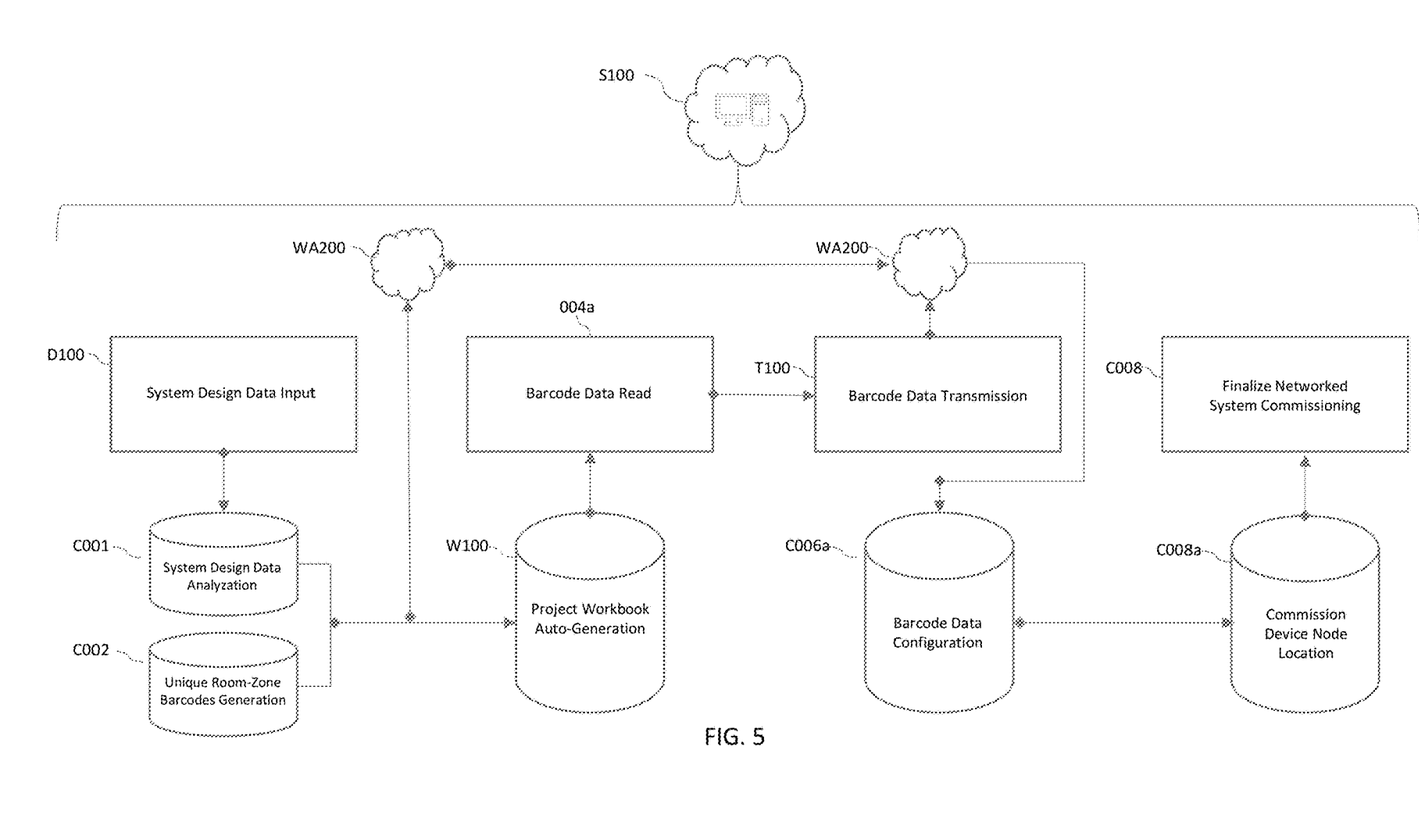
FIG. 5 shows an example of how a building system device node commissioning system, method and tool may be used to create custom project workbooks, unique room-zone barcode identifiers, and a web-application/webform to effectively track building system device node locations in accordance with exemplary embodiments of the invention.

Accordingly, the inventors hereof have developed and disclose herein exemplary embodiments (e.g., building system device node commissioning systems and methods, commissioning apparatus, tools, and devices, etc.) that allow for the grouping and tracking of building system device node addresses. For example, FIG. 5 shows an exemplary embodiment of a building system device node commissioning system S100 that may be used for grouping and tracking the building system device nodes F1,1 to F8,4 and C1,1 to C9,3 shown in FIG. 1 via grouping areas R1 to R9. In this exemplary embodiment, the building system device node commissioning system S100 allows for the custom creation of unique room-zone barcode identifiers C002 (FIG. 5) that are incorporated into a custom project workbook W100 (FIGS. 3 and 5). Each individual room-zone barcode identifier C002 (FIG. 5) and custom project workbook W100 (FIGS. 3 and 5) may be auto-generated in accordance with exemplary embodiments of the building system device node commissioning system S100 (FIG. 5), method M100 (FIG. 4), and commissioning apparatus, tool, or device T100 (FIGS. 3 and 4).

Figure 2:
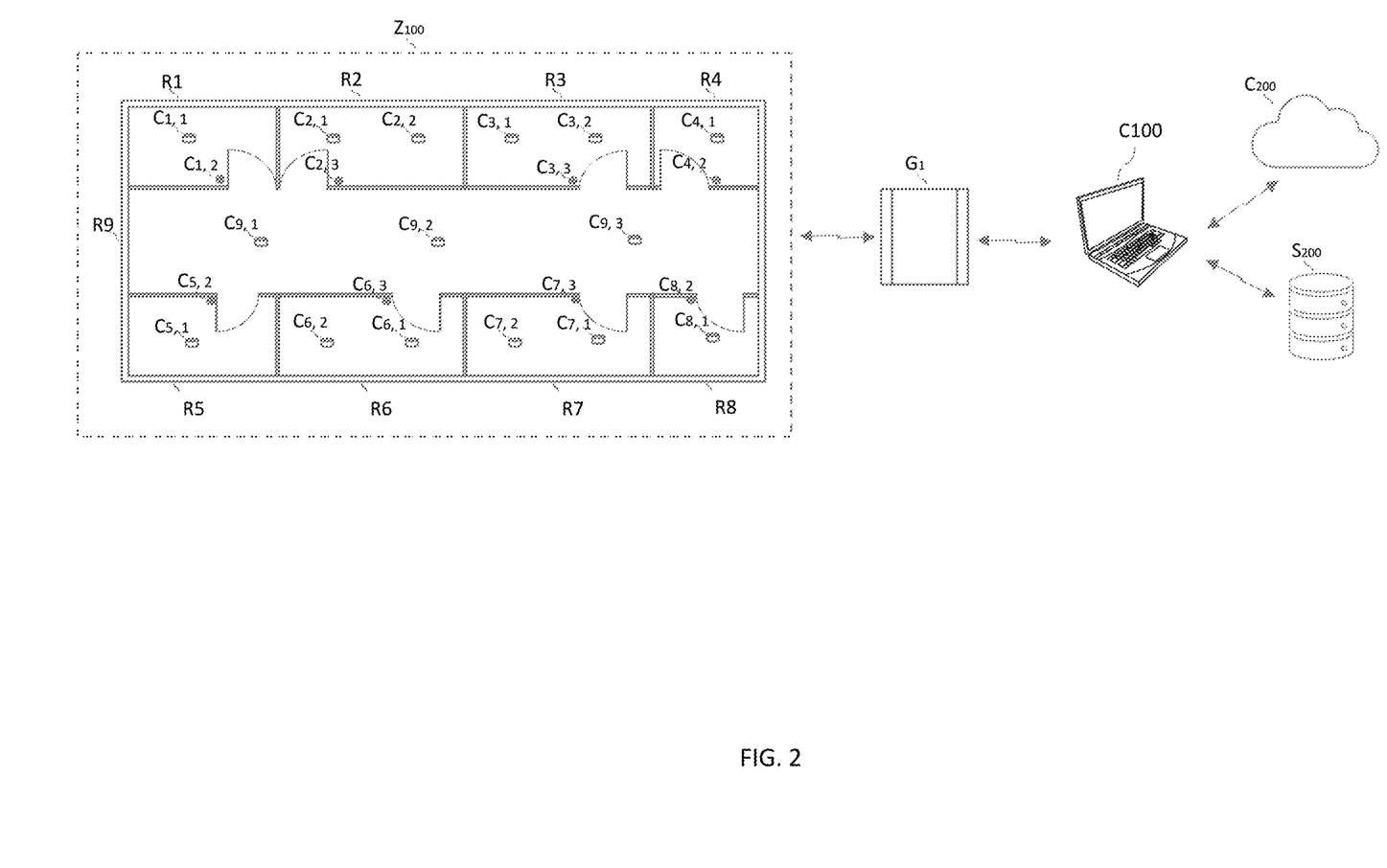
FIG. 2 shows typical communication pathways of building system device nodes within a system platform of a networked system.

FIG. 2 depicts common communication transmission pathways of a networked system platform conforming to a wireless-based standard for purposes of example only to demonstrate utility of exemplary embodiments disclosed herein (e.g., building system device node commissioning systems, methods, apparatus, tools, devices, system S100 (FIGS. 3 and 5), method M100 (FIG. 4), commissioning tool T100 (FIGS. 3 and 4), etc.). In FIG. 2, Z100 indicates a common building schematic depicting area groupings represented by R1, R2, R3, R4, R5, R6, R7, R8, R9 shown in FIG. 1.

Within each area grouping, building system device nodes are represented by figures C1,1 to C9,3. Each building system device node includes or is provided with a unique identifier or identifying tag, which in this example is a Media Access Control (MAC) address and/or an individual IEEE address. These building system device nodes communicate with a system gateway G1. This system gateway G1 is operable as a primary communication link for each building system device node to the networked system platforms C200 and S200. In this example, C200 represents a cloud-based networked system platform, and S200 represents an onsite server-based networked system platform.

Communication from the system gateway G1 to these networked system platforms C200 and S200 is accomplished via or completed by a networked system platform-specific commissioning device C100. This networked system platform-specific commissioning device C100 receives data from the building system devices C1,1 to C9,3 via the system gateway G1 to transmit configuration details (e.g., acknowledgement of which building system device nodes C1,1 to C9,3 have joined the network and/or are operable, etc.) to the networked system platform(s) C200 and/or S200. When building system device nodes C1,1 to C9,3 are commissioned into the networked system platform(s) C200/S200 via the system gateway G1, the physical locations of the building system device nodes C1,1 to C9,3 are not transferred. Rather, only the active state (e.g., wired and powered, etc.) building system device nodes C1,1 to C9,3 join the network through the system gateway G1 via the networked system platform-specific commissioning device C100. Exact building system device node C1,1 to C9,3 locations are later determined to finalize the commissioning process.

With the exemplary embodiment shown in FIG. 5, the system S100 allows for the effective and efficient tracking of building system device node C1,1 to C9,3 locations via custom project workbooks W100 (FIGS. 3 and 5) that are auto-generated. The custom project workbooks W100 and commissioning apparatus, device, or tool T100 (FIGS. 3 and 4) are configured to track the unique address of each building system device node C1,1 to C9,3 (e.g., MAC/IEEE address) and seamlessly transmits the data for later use with the system platform-specific commissioning device C100.

FIG. 3 depicts the process by which the exemplary embodiment of the system S100 may be used to track and transfer unique identifiers or addresses of building system device nodes as represented by the networked system design D100. As shown in FIG. 3, the networked system design D100 data may be provided to or placed into the system S100 (or first system component(s) S100A thereof). The system S100 analyzes the system design D100 data and generates (e.g., automatically generates, auto-generates, etc.) custom project workbooks W100 that contain unique room-zone barcode identifiers C002 (FIG. 5).

As shown in FIG. 3, the custom project workbooks W100 may then be supplied to the installing contractor P100 who is responsible for installing the devices per the networked system design D100. The installing contractor P100 may then utilize the custom project workbooks W100 to place the building system device node barcodes B100 in their respective installed areas as indicated with the unique room-zone barcode identifiers C002 (FIG. 5) auto-generated by the system S100.

After the building system node devices are installed per the networked system design D100, the commissioning apparatus, tool, or device T100 may be used to read and transmit barcode data to the system S100 (or second system component(s) S100B thereof). The system S100 may then be used in conjunction with or in parallel with the networked system platform-specific commissioning device C100 to commission the building system device nodes per the networked system design D100. By way of example only, the commissioning apparatus, tool, or device T100 may comprise a portable, handheld, in-the-field, wireless electronic device (e.g., smartphone, tablet, etc.) that is specifically designed or configured for smart building system integration by utilizing advanced scripting technology as disclosed herein. Also, by way of example only, the commissioning apparatus, tool, or device T100 may comprise a smartphone that has been configured or modified with an exterior barcode scanner and with limited usability to data gathering and transmission, e.g., via software, etc.

FIG. 4 illustrates an exemplary building system device node commissioning method M100 in accordance with exemplary embodiments of the invention. As shown in FIG. 4, a first step, operation, or process includes determining or obtaining the system design D100. After the system design D100 is determined or obtained, the design configuration data (e.g. building system device node quantities, locations, area grouping, etc.) may be used to create (e.g., converted into, etc.) unique room-zone barcode identifiers C002.

After the unique room-zone barcode identifiers C002 are created, custom project workbooks W100 may be generated (e.g., auto-generated by the system S100, etc.) with or by using the unique room-zone barcode identifiers C002 and system design details.

The custom project workbooks W100 may then be supplied to the installing contractor P100. As building system device nodes (e.g., C1,1 to C9,3 shown in FIG. 2, etc.) are physically installed, the building system device barcodes B100 (FIG. 3) are placed into the custom project workbooks W100 as shown by step, operation, or process 1004 in FIG. 4. The building system device nodes may be physically installed and device IEEE stickers may be placed into custom project workbooks W100 per the custom room-zone barcode identifiers B100.

After installation, the commissioning tool, device, or apparatus T100 may be used to read, scan, and/or transmit the unique room-zone barcode C002 and the building system device barcodes B100 to the system S100 (FIG. 3). The custom project workbook data may be transmitted to a cloud server by scanning the custom room-zone barcode identifiers C002 and individual device IEEE address barcodes B100 using the commissioning tool, device, or apparatus T100. The transmitted device data may be used to identify the locations L006 of the installed building system device nodes.

The system S100 may catalogue and store the building system device node locations L006. The building system device node locations L006 may be zoned and commissioned into system control software.

The system S100 may be used in conjunction with or in parallel with the networked system platform-specific commissioning device C100 (FIG. 3) to commission the building system device node locations L006 into the network system platform C008. After the system is commissioned C008, the project may then be closed.

FIG. 5 shows how the exemplary embodiment of the system S100 may be used to effectively and efficiently track identifying addresses (e.g. MAC/IEEE addresses, etc.) of building system device nodes and to auto-generate unique room-zone barcode identifiers C002, custom project workbooks W100, and a custom web-application/webform WA200. FIG. 5 also shows how the exemplary embodiment of the system S100 may be used in tandem with the networked system platform-specific commissioning device C100 to commission building device node locations L006.

As shown in FIG. 5, networked system design D100 data is input into the system S100. The system S100 is configured to analyze the system design data and auto-generate unique room-zone barcodes C002 based on the networked system design D100. By way of example, the system S100 may include a non-transitory computer-readable storage media (broadly, a memory) comprising computer-executable instructions, which when executed by at least one processor, cause the at least one processor to analyze the system design data and auto-generate unique room-zone barcodes C002 based on the networked system design D100.

Continuing with this example, the non-transitory computer-readable storage media may be a first non-transitory computer-readable storage media, e.g., that that can run intelligent recalc software, etc. The computer-executable instructions may comprise a first custom scripting code on the first non-transitory computer-readable storage media, which when executed by a first processor, cause the first processor to analyze the system design data and to use an Alder-32 check sum algorithm to auto-generate the unique room-zone barcodes C002 based on the networked system design D100. Alternatively, the first custom scripting code may reside on the web (e.g., housed on web-based Google Sheets platform, etc.).

The Adler-32 check sum algorithm may be used as follows by the system S100. The system S100 concatenates the Floor, Area, and Zone-Room, and then applies the Adler-32 check sum algorithm to generate a unique checksum (e.g., 16 digits, etc.), which is then converted to a barcode. When the barcode is scanned (e.g., using the commissioning tool T100, etc.), the system S100 and/or the commission tool T100 then searches a spreadsheet and finds the actual Floor, Area, and Zone-Room and obtains or pulls all the devices for that room. Advantageously, the Alder-32 check sum algorithm may be selected for its shorter string and ability to work better with barcode scanners, although other check sum algorithms may be used in other exemplary embodiments.

The system S100 is also configured to auto-generate the custom project workbooks W100. By way of example, the system S100 may comprise computer-executable instructions, which when executed by at least one processor, cause the at least one processor to auto-generate the custom project workbooks W100. Continuing with this example, the computer-executable instructions may comprise a second custom scripting code stored on the first non-transitory computer-readable storage media or stored on a different second non-transitory computer-readable storage media, e.g., that that can run intelligent recalc software, etc. Alternatively, the second custom scripting code may reside on the web (e.g., housed on web-based Google Sheets platform, etc.). The processor that executes the second custom scripting code may be the first processor or a different second processor of the system S100.

The custom project workbooks W100 may be supplied to the installing contractor P100. Building system device node unique identification barcodes (e.g. MAC/IEEE addresses) are recorded in the custom project workbooks W100.

In conjunction with auto-generating the unique room-zone barcodes C002 and the custom project workbooks W100, the system S100 is also configured to create a web-application/webform WA200. By way of example, the system S100 may comprise computer-executable instructions, which when executed by at least one processor, cause the at least one processor to create a web-application/webform WA200. Continuing this example, the computer-executable instructions may comprise a third custom scripting code stored on the first non-transitory computer-readable storage media, the second non-transitory computer-readable storage media (if there is one), or a different third non-transitory computer-readable storage media, e.g., that that can run intelligent recalc software, etc. Alternatively, the third custom scripting code may reside on the web (e.g., housed on web-based Google Sheets platform, etc.). The processor that executes the third custom scripting code may be the first processor, the second processor (if there is one), or a different third processor of the system S100.

Accordingly, the system S100 may include a single non-transitory computer-readable storage media that includes the first, second, and third custom scripting codes and that may be able to run intelligent recalc software, etc. Or, the system S100 may include more than one or multiple non-transitory computer-readable storage media that includes more than one of the first, second, and third custom scripting codes. Similarly, the system S100 may include a single processor that executes the first, second, and third custom scripting codes, or the system S100 may include more than one processor. As yet another example, the system S100 may include first, second, and third separate scripting codes for respectively executing the three separate tasks of (a) analyzing the system design D100 data, (b) auto-generating custom project workbooks, and (c) creating web-application/webform WA00. The first, second, and third separate scripting codes may reside on the web (e.g., on a web-based Google Sheets platform, etc.) and/or in a single or multiple computer readable media that that can run intelligent recalc software.

The web-application/webform WA200 is a client-server software application in which the client (or user interface) runs in a web browser and works in tandem with the project workbook W100 and the commissioning tool T100 to read (004a) and transmit the barcode data contained in the project workbook W100 back to an internal store (C006a) or computer readable medium of the system S100. At the time of commissioning building system device nodes, the system S100 may be used in tandem with the networked system platform-specific commissioning device C100 and a commissioning specialist to commission device node locations C008a and to finalize networked system commissioning C008.

Exemplary embodiments are disclosed herein of building system device node commissioning systems (e.g., system S100 (FIGS. 3 and 5), etc.), methods (e.g., M100 (FIG. 4), etc.), and commissioning tools, apparatus, or devices (e.g., commissioning tool T100 (FIGS. 3 and 4), etc.) that may provide one or more (but not necessarily any or all) of the following advantages. For example, exemplary embodiments disclosed herein may allow for streamlining the implementation, installation, functionality, and commissioning of smart building systems. Exemplary embodiments may provide streamlined system commissioning while ensuring operational integrity and/or may allow for efficient, accurate, and consistent commissioning of building system device nodes and/or may help bridge the gap between commercial IoT (Internet of Things) device manufacturers and installation contractors.

In exemplary embodiments, the commissioning apparatus, tool, or device T100 may be configured to be a portable, handheld, in-the-field, wireless electronic device (e.g., smartphone, tablet, etc.) that is specifically designed or configured for smart building system integration by utilizing advanced scripting technology as disclosed herein. By way of example, only, the commissioning apparatus, tool, or device T100 may comprise a smartphone that has been configured or modified with an exterior barcode scanner and with limited usability for data gathering and transmission, e.g., via software, etc. Using an exemplary embodiment of the commissioning apparatus, tool, or device may allow for enhancing installation accuracy, construction timeliness, and overall commissioning efficiency of smart building systems and/or help ensure that an Internet-of-Things (IoT) building control project happens successfully without any problems.

Exemplary embodiments may include a computing device, such as one or more servers, workstations, personal computers, laptops, tablets, smartphones, person digital assistants (PDAs), etc. In addition, the computing device may include a single computing device, or it may include multiple computing devices located in close proximity or distributed over a geographic region, so long as the computing devices are specifically configured to function as described herein. Further, different components and/or arrangements of components than illustrated herein may be used in the computing device and/or in other computing device embodiments.

Exemplary embodiments may include a processor and a memory coupled to (and in communication with) the processor. The processor may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

In exemplary embodiments, the memory may be one or more devices that permit data, instructions, etc., to be stored therein and retrieved therefrom. The memory may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, and/or any other type of volatile or nonvolatile physical or tangible computer-readable media.

In exemplary embodiments, computer-executable instructions may be stored in the memory for execution by the processor to particularly cause the processor to perform one or more of the functions described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the functions or processes described herein.

In exemplary embodiments, a network interface may be coupled to (and in communication with) the processor and the memory. The network interface may include, without limitation, a wired network adapter, a wireless network adapter, a mobile network adapter, or other device capable of communicating to one or more different networks. In some exemplary embodiments, one or more network interfaces may be incorporated into or with the processor.

It should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or databases and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) generating unique room-zone identifiers for building system device nodes from networked system design data; (b) generating one or more custom project workbooks for inclusion of the unique room-zone identifiers and individual device addresses for installed building system device nodes; (c) identifying and/or commissioning physical locations of the installed building system device nodes using the one or more custom project workbooks including the unique room-zone identifiers and the individual device addresses of the installed building system device nodes.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, or features, these elements, components, or features should not be limited by these terms. These terms may be only used to distinguish one element, component, or feature from another element, component, or feature. Terms such as "first," "second," and other numerical terms when used herein do not imply a sequence or order unless clearly indicated by the context. Thus, a first element, component, or feature could be termed a second element, component, or feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for commissioning a plurality of building system device node barcodes in a networked system of a smart building system integration, each of the plurality of building system device node barcodes having an individual device address, the system comprising:
   at least one commissioning apparatus including at least one input for receiving networked system design data and at least one processor configured to:
   analyze the received networked system design data, the received networked system design data comprising: node locations, and area groupings;
   generate a plurality of unique room-zone barcode identifiers for each of the plurality of the building system device node barcodes by systematically linking the received networked system design data comprising the node locations and the area groupings;
   generate one or more custom project workbooks for storage of each of the plurality of the unique room-zone barcode identifiers and the individual device addresses for each of the plurality of building system device node barcodes;
   install, using an installation contractor, the one or more custom project workbooks in response to obtaining the received networked system design data;
   determine an active state of each building system device node barcode;
   identify, using the one or more custom project workbooks, a plurality of physical locations, each of the plurality of physical locations being associated with each of the plurality of the installed building system device node barcodes, the one or more custom project workbooks including the unique room-zone barcode identifiers and the individual device addresses of each of the building system device node barcodes; and
   place, using the installation contractor, the building system device node barcodes in the identified physical locations.

2. The system of claim 1, wherein the individual device addresses comprise device barcodes including a Media Access Control (MAC) address and/or an individual IEEE address for the corresponding building system device nodes; and the apparatus is configured to scan the unique room-zone barcode identifiers and the device barcodes that are in the one or one or more custom project workbooks, and to use the scanned data to identify the physical locations of each of the plurality of the building system device node barcodes.

3. The system of claim 1, further comprising a web-application/webform configured to allow tracking of the physical locations of each of the plurality of building system device node barcodes.

4. The system of claim 1, wherein the at least one processor is further configured to automatically generate the one or more custom project workbooks.

5. The system of claim 1, wherein the apparatus comprises a portable wireless electronic device.

6. The system of claim 1, wherein the apparatus further comprises a non-transitory computer-readable storage media comprising computer-executable instructions, which when executed by the at least one processor, cause the at least one processor to:
   analyze the received networked system design data comprising: node locations, and area groupings;
   generate unique room-zone barcode identifiers for each of the plurality of the building system device node barcodes by systematically linking the design data comprising the node locations and the area groupings;
   generate one or more custom project workbooks for inclusion of the unique room-zone barcode identifiers and the individual device addresses for installed building system device nodes;
   determine an active state of each of the plurality of building system device node barcodes; and
   identify physical locations of the each of the plurality of the building system device node barcodes using the one or more custom project workbooks including the unique room-zone barcode identifiers and the individual device addresses of each of the plurality of the building system device node barcodes.

7. The system of claim 1, wherein: the networked system design data further includes building system device node quantities and/or the building system device nodes comprise one or more of a luminaire device node and/or an occupancy sensor device node; and/or the building system device nodes are configured to communicate with each other and with a networked system platform.

8. The system of claim 1, wherein the system comprises:
   at least one networked system platform including a cloud-based networked system platform and/or an onsite server-based networked system platform;
   a system gateway configured for communication with each of the plurality of the building system device node barcodes and operable as a communication link between each of the plurality of the building system device node barcodes and the at least one networked system platform; and
   a networked system platform-specific commissioning device configured to:
   receive data from each of the plurality of the building system device node barcodes via the system gateway, and
   based on the determination of active state for each of the plurality of the building system device node barcodes, transmit configuration details including acknowledgement of which building system device nodes have joined the network and/or are operable to the at least one networked system platform and without transferring physical locations of each of the plurality of the building system device node barcodes.

9. A computer-implemented method for commissioning a plurality of building system device node barcodes in a networked system of a smart building system integration, each of plurality of the building system device node barcodes having an individual device address, the method comprising:
generating, by a computing device, a plurality of unique room-zone barcode identifiers for each of the plurality of the building system device node barcodes from networked system design data, that comprises node locations and area groupings, by systematically linking the networked system design data, the networked system design data comprising the node locations and the area groupings;
generating, by the computer device, one or more custom project workbooks for storage of each of the plurality of the unique room-zone barcode identifiers and the individual device addresses for each of the plurality of building system device node barcodes;
install, using an installation contractor, the one or more custom project workbooks in response to obtaining the networked system design data;
determining an active state of each of the plurality of the building system device node barcodes; and
identifying and/or commissioning, by the computer device using the one or more custom project workbooks, a plurality of physical locations, each of the plurality of physical locations being associated with each of the plurality of the installed building system device node barcodes, the one or more custom project workbooks including the unique room-zone identifiers and the individual device addresses of each of the building system device node barcodes.

10. The method of claim 9, wherein the method further comprises tracking the physical locations of the building system device node barcodes using a web-application/webform.

11. The method of claim 9, wherein the method further comprises adding the unique room-zone barcode identifiers and the individual device addresses for each of the plurality of the building system device node barcodes to the one or more custom project workbooks as each of the plurality of the building system device node barcodes are physically installed in their respective installed areas as indicated by the unique room-zone barcode identifiers.

12. The method of claim 9, wherein: the unique room-zone barcode identifiers comprise the individual device addresses comprise device barcodes including a Media Access Control (MAC) address and/or an individual IEEE address for the corresponding building system device nodes; and the method includes scanning the unique room-zone barcode identifiers and the device barcodes and using the scanned data for identifying the locations of each of the plurality of the building system device node barcodes.

13. The method of claim 9, wherein: generating, by the computing device, unique room-zone barcode identifiers for each of the plurality of the building system device node barcodes from the networked system design data further comprises generating, by the computer device, one or more custom project workbooks comprises automatically generating the one or more custom project workbooks.

14. The method of claim 9, wherein: the networked system design data includes building system device node quantities and/or the method includes using the unique room-zone barcode identifiers for grouping and tracking of each of the plurality of the building system device node barcodes via grouping areas representing rooms and/or zones on a given floor of a building.

15. The method of claim 9, wherein the method includes: scanning the unique room-zone barcode identifiers and individual device addresses for installed building system device nodes that are in the one or more or more custom project workbooks; and transmitting the scanned data for use in identifying the physical locations of each of the plurality of the building system device node barcodes.

16. A non-transitory computer-readable storage media comprising computer-executable instructions for commissioning a plurality of building system device node barcodes in a networked system of a smart building system integration, which when executed by at least one processor, cause the at least one processor to:
analyze networked system design data, the networked system design data comprising: node locations, and area groupings;
generate a plurality of unique room-zone barcode identifiers for each of the plurality of the building system device node barcodes by systematically linking the networked system design data comprising the node locations and the area groupings;
generate one or more custom project workbooks for storage of each of the plurality of the unique room-zone barcode identifiers and individual device addresses for installed building system device node barcodes;
install, using an installation contractor, the one or more custom project workbooks in response to obtaining the networked system design data;
determine an active state of each of the plurality of building system device node barcodes; and
identify physical locations of the building system device node barcodes using the one or more custom project workbooks including the unique room-zone barcode identifiers and the individual device addresses of the installed building system device node barcodes.

17. The non-transitory computer-readable storage media of claim 16, wherein the individual device addresses comprise device barcodes including a Media Access Control (MAC) address and/or an individual IEEE address for each of the plurality of the corresponding building system device node barcodes; and the computer-executable instructions, when executed by the at least one processor, cause the at least one processor to use the unique room-zone barcode identifiers and the device barcodes that are in the one or more or more custom project workbooks to identify the physical locations of each of the plurality of the building system device node barcodes.

18. The non-transitory computer-readable storage media of claim 16, wherein the computer-executable instructions, when executed by the at least one processor, cause the at least one processor to automatically generate the one or more custom project workbooks.

19. The non-transitory computer-readable storage media of claim 16, wherein the computer-executable instructions, when executed by the at least one processor, further cause the at least one processor to create a web-application/webform configured to allow tracking of the physical locations of the building system device node barcodes.

20. A portable wireless commissioning tool comprising the at least one processor and the non-transitory computer-readable storage media including the computer-executable instructions of claim 16.

* * * * *